Figure 3:
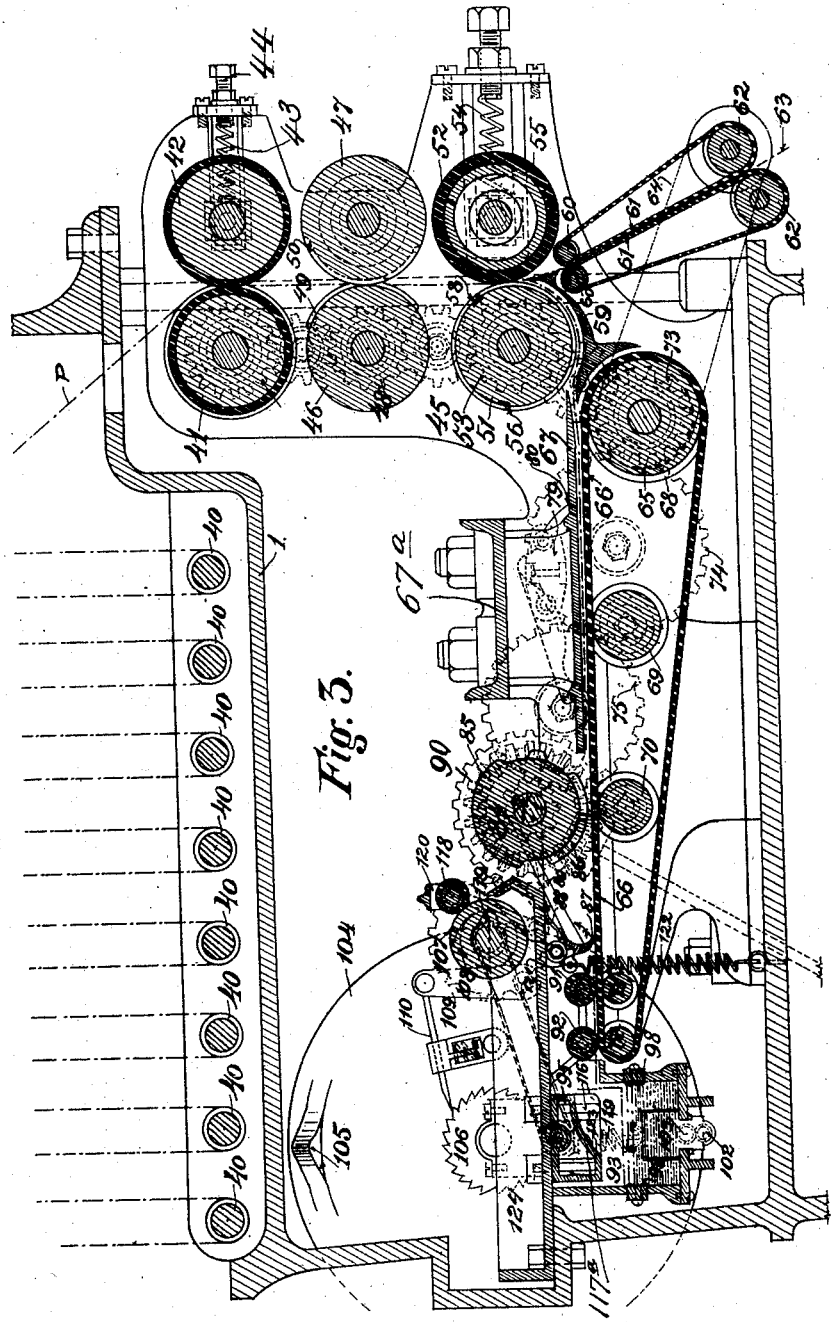

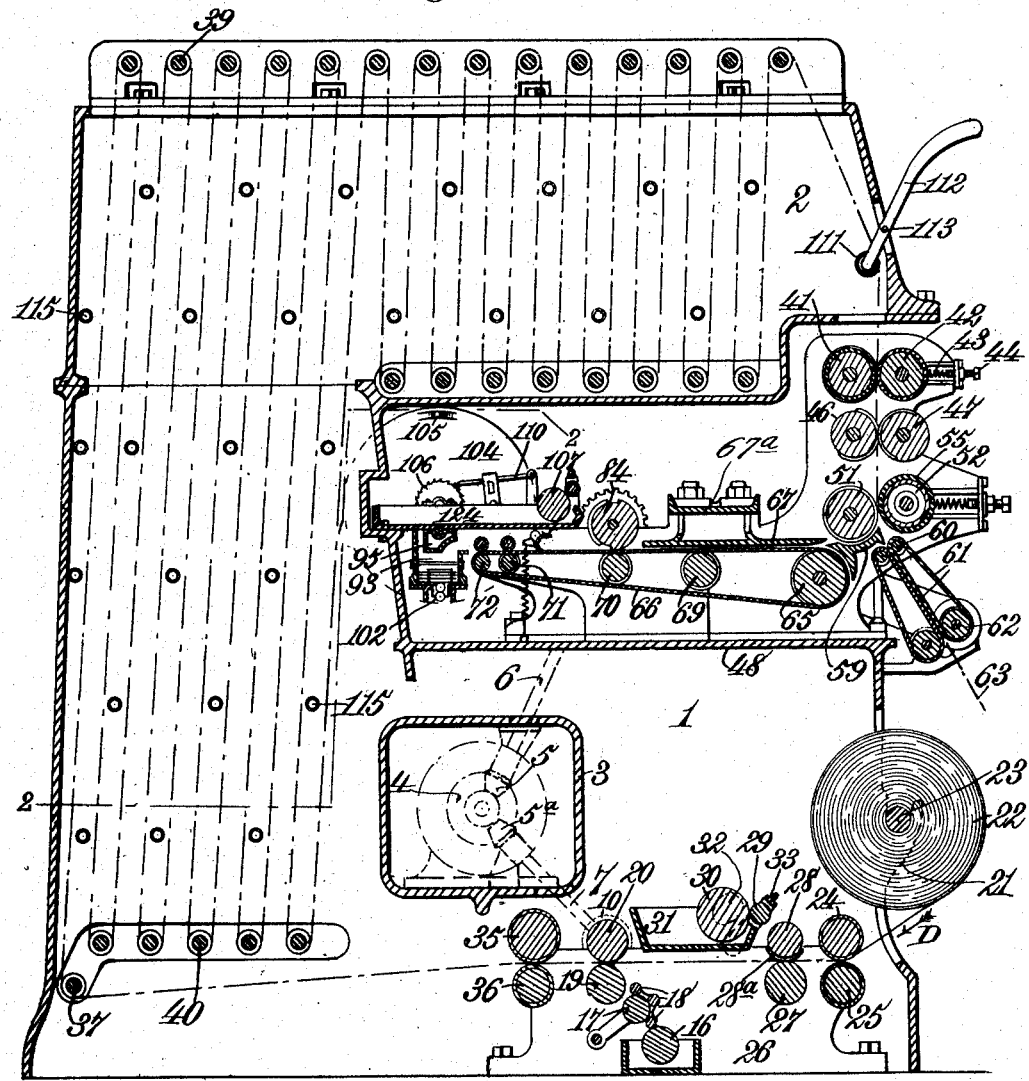

A. J. ACKERMAN.
ENVELOP MACHINE.
APPLICATION FILED DEC. 7, 1908.
974,621.
Patented Nov. 1, 1910.
7 SHEETS—SHEET 2.
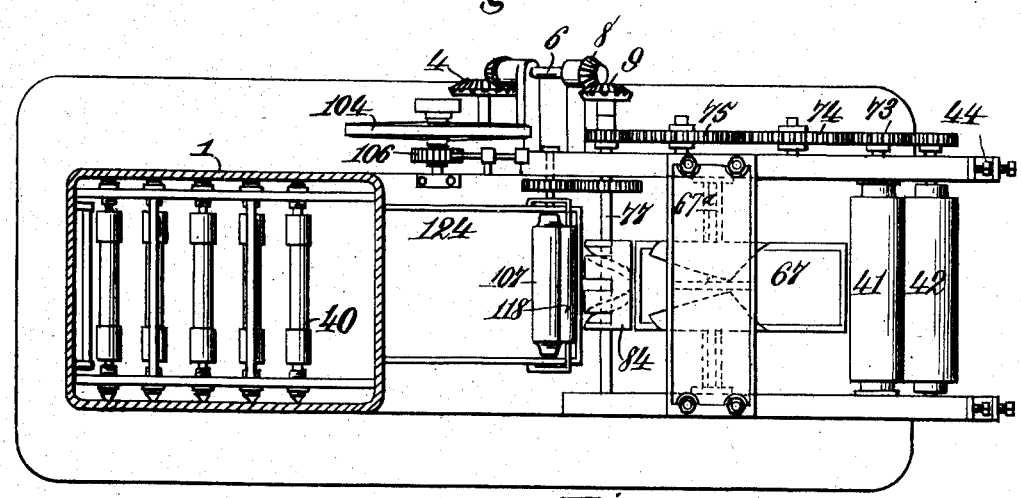
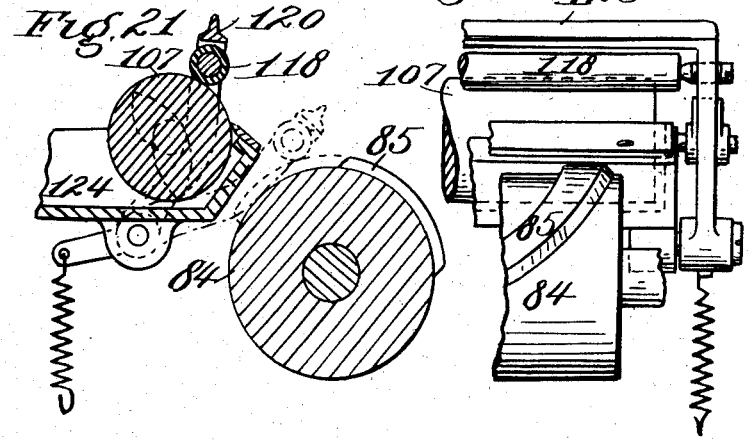

A. J. ACKERMAN.
ENVELOP MACHINE.
APPLICATION FILED DEC. 7, 1908.

974,621.

Patented Nov. 1, 1910.
7 SHEETS—SHEET 3.

WITNESSES

INVENTOR
Albert J. Ackerman.
BY
James L. Norris
ATTORNEY

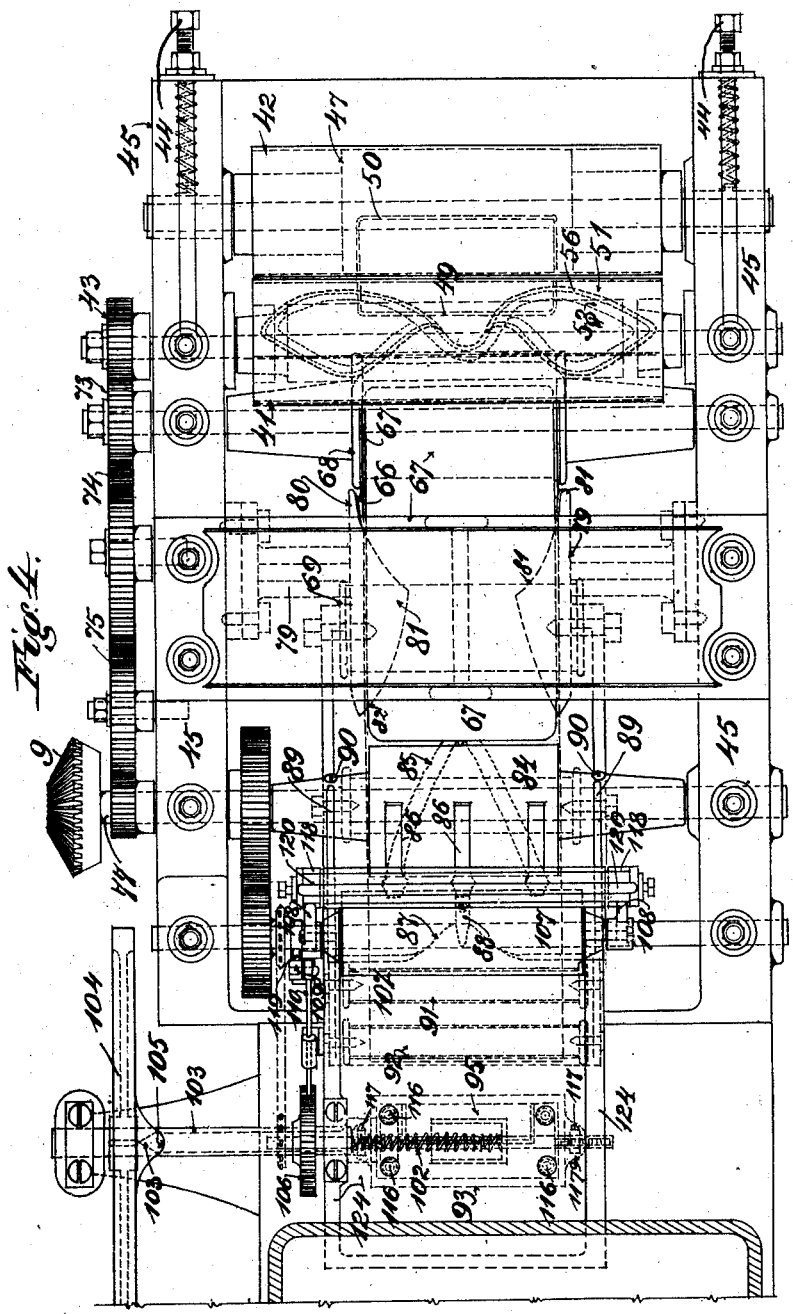

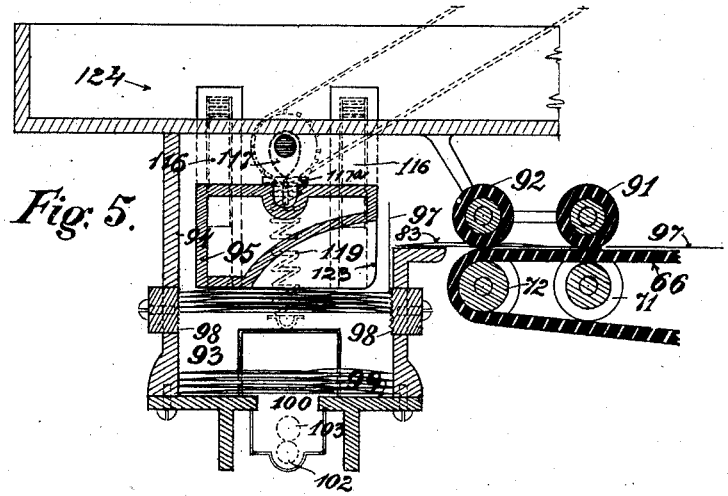
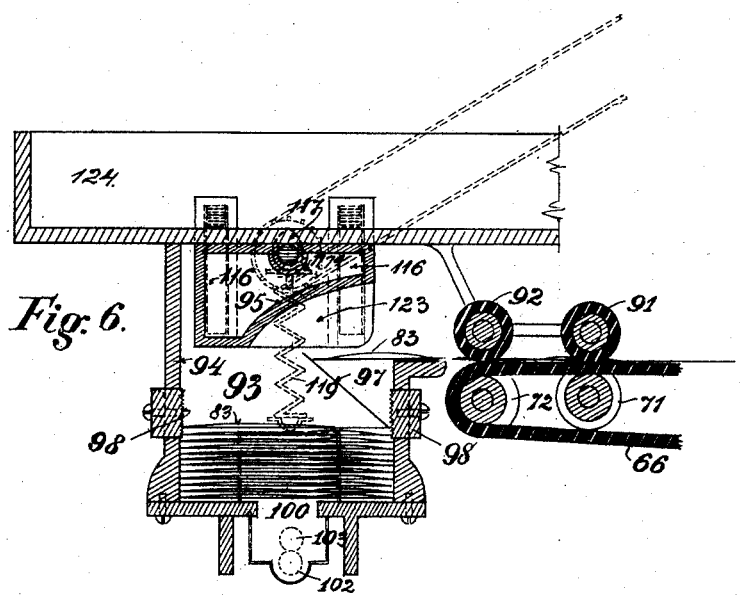

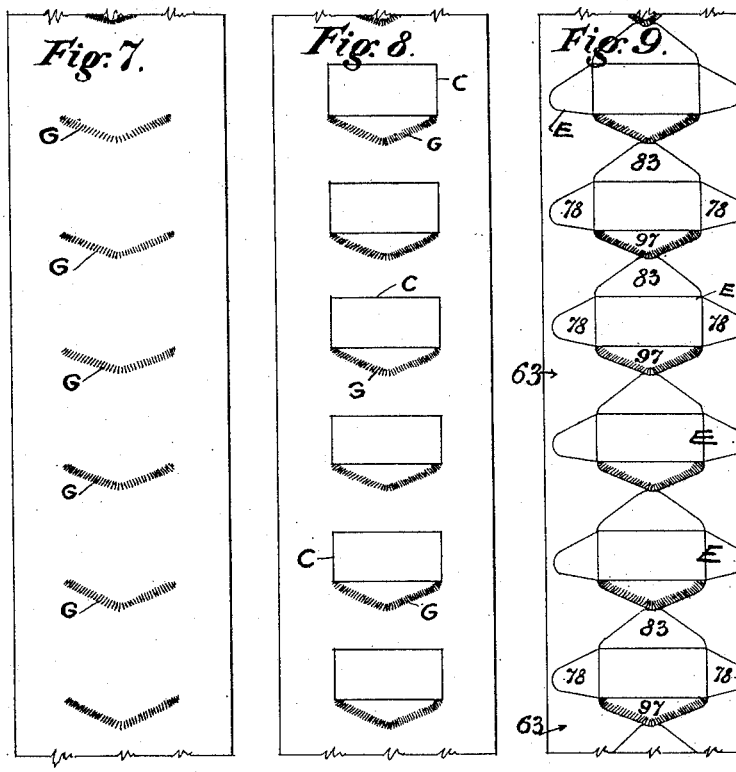
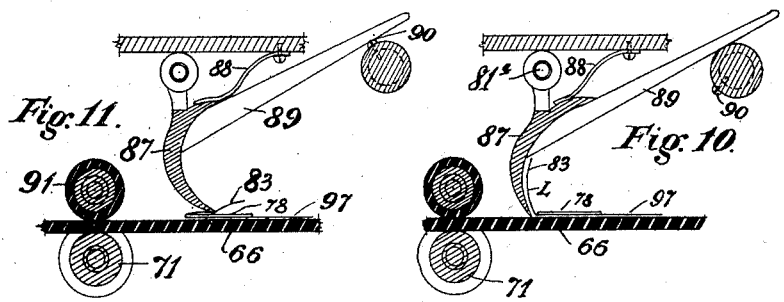

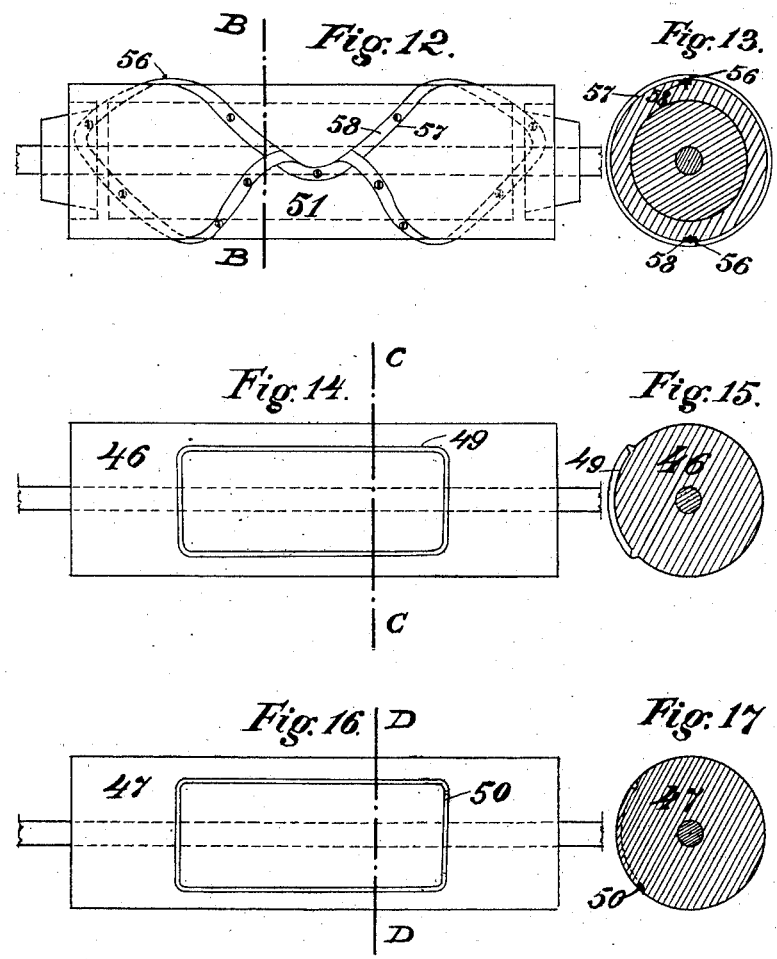

UNITED STATES PATENT OFFICE.

ALBERT J. ACKERMAN, OF NEW YORK, N. Y., ASSIGNOR TO CHARLES DE LUKACSEVICS, OF NEW YORK, N. Y.

ENVELOP-MACHINE.

974,621.  Specification of Letters Patent.  Patented Nov. 1, 1910.

Application filed December 7, 1908. Serial No. 466,321.

*To all whom it may concern:*

Be it known that I, ALBERT J. ACKERMAN, a citizen of the United States, residing at New York, in the county of New York and State of New York, have invented new and useful Improvements in Envelop-Machines, of which the following is a specification.

My present invention relates to improvements in envelop machines and more especially to the type wherein the envelops are formed automatically from a continuous web of paper, and it has for its object primarily to provide a machine of this class wherein the gumming of the sealing flap or, in some cases, both the gumming of the sealing flap and the printing of the envelop are accomplished initially and prior to the cutting of the envelop blank from the web after which gumming operation, the material is passed through an appropriate drying chamber before the subsequent operations of creasing, cutting the envelop blanks from the web and folding are performed whereby the tendency of the sealing lapel to coil due to the contraction of the gum applied thereto in those cases where the sealing gum is applied after the blank has been cut, is avoided.

Another object of the invention is to provide an envelop machine wherein the material is supplied thereto in the form of a continuous strip or web, the first operation being the application of the sealing gum upon those portions of the strip or web which will subsequently form the sealing flaps of the envelops, and to also print the desired inscription upon that side of the strip opposite to that which receives the sealing gum. The strip is then conducted through a drying chamber wherein the gum and ink are thoroughly dried, and as the strip leaves the drying chamber, it passes first between a pair of creasing rollers, thence to a pair of cutting rollers which latter rollers cut the envelop blanks from the strip. As the latter advances, the envelop blanks will be stripped from the web and conducted through a folding device which serves to fold inwardly the end flaps of the blanks. As the blanks progress, gum is applied to the end flaps and the bottom flap of the envelope is then folded and sealed upon the end flaps, the envelops thus formed being finally conducted to a stacking device from which the envelops are delivered.

Another object of the invention is to provide an automatic machine of this class wherein the envelop blanks before leaving the device which performs one operation thereon are engaged by the devices which perform the next operation, so that the proper feeding of the blanks to the machine is insured.

A further object of the invention is to provide an improved stacking and delivering device for machines of this class wherein the envelops are stacked and delivered automatically in lots of predetermined numbers.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a vertical section of an envelop machine constructed in accordance with my present invention; Fig. 2 represents a sectional plan view of the machine as shown in Fig. 1, that portion thereof in section being taken upon the line 2—2 of Fig. 1; Fig. 3 represents an enlarged sectional elevation of the device for creasing the web and cutting the blanks therefrom, the devices for folding and pasting the side and bottom flaps and for delivering the completed envelops in predetermined lots; Fig. 4 is a plan view of that portion of the apparatus shown in Fig. 3; Figs. 5 and 6 represent enlarged sectional elevations of the delivering device, the former figure showing the mode of folding the sealing flap, and the latter figure showing the mode of introducing the envelops into the delivering device when the plunger thereof is elevated; Fig. 7 is a diagrammatic view of the strip or web showing the manner of applying the gum to those portions thereof which will subsequently constitute the sealing flaps of the envelops; Fig. 8 is a diagrammatic view of the strip showing its condition after passing between the creasing rollers; Fig. 9 is also a diagrammatic view of the strip showing the mode of cutting the envelop blanks therefrom; Fig. 10 is an enlarged sectional view of the folding device for the bottom flap, the said flap in this figure being turned up preparatory to the folding operation;

Fig. 11 is a view similar to Fig. 10 showing the manner of completing the fold of the bottom flap; Fig. 12 is a detail view of the rotary knife which cuts the blanks from the strip; Fig. 13 represents a transverse section of this knife on the section line B—B of Fig. 12; Figs. 14 and 16 are detail views of the creasing rollers; Figs. 15 and 17 are sectional views of these rollers taken on the lines C—C and D—D, respectively, of Figs. 14 and 16; Fig. 18 is a side elevation of one of the folding plates for the end flaps of the envelop; Fig. 19 is a plan view of the folding plate shown in Fig. 18; Fig. 20 is an end elevation of the said folding plate, and Figs. 21 and 22 are detail views of the mechanism for operating the gum-applying roll.

Similar parts are designated by the same reference characters in the several views.

In the accompanying drawing, I have shown one specific embodiment of the invention as applied to an envelop-making machine wherein the material is fed in the form of a continuous strip or web, the operations of applying the gum for the sealing flap, printing matter upon the envelop, the creasing of the blank and the cutting of the blank upon the strip being all performed before the blanks are separated from the strip so that the material is fed to the machine with the greatest facility, the machine is capable of operating at comparatively high speed, crumpling or damage to the envelops is avoided, and contraction of the edge of the sealing flap of the envelop is avoided. It will be understood, however, that I have shown but one embodiment of the invention, and that certain modifications and changes may be made in the relative arrangement of the parts or in the detail construction thereof in order that the invention may be applied to the best advantage in each particular case.

In the present instance, the machine comprises a base frame 1 and an upper frame 2 which is superposed thereon, both of these frames being preferably in the form of casings whereby they may inclose the various parts of the machine. Within the base frame 1 is mounted a compartment 3 adapted to contain an electric or other appropriate motor, the shaft of the motor having a bevel gear 4 thereon which coöperates with appropriate gears 5 and 5ª arranged on the shafts 6 and 7, respectively, the shaft 6 being provided with a bevel gear 8 which coöperates with a similar gear 9 mounted upon the shaft of the gumming roller 84 which applies the gum to the bottom flap of the envelop, while the shaft 7 is connected by suitable gearing to the gumming mechanism for the sealing flap and the printing device, the latter mechanism being driven through the transmission gear 10 which is connected to the shaft 7. The printing mechanism may be of any appropriate character, and it is therefore considered unnecessary to describe the same in detail, it consisting in the present instance of a main ink supply roller 16 with which one of a set of supplemental ink rollers 18 coöperates, the supplemental rollers being arranged about the periphery of an ink distributing roller 17, the ink being supplied from these rollers to an appropriate printing roller 19 which is arranged opposite to the coöperating roller 20 and is adapted to apply an appropriate impression to the web as it passes between such rollers.

The opposite sides of the base frame are provided with appropriate bearing brackets 21 to support a paper roll 22 which is carried by a shaft 23, the latter resting upon the bearing brackets, the web of paper from the roll passing into the machine in the direction of the arrow D shown in Fig. 1. The paper strip is initially fed to the machine by a pair of feed rollers 24 and 25, these feed rollers being driven in an appropriate manner by suitable gearing driven from the shaft 7 and they are supported in the side frames 26 which carry the printing and gumming devices for the sealing flap. One of these rollers, the roller 25 in the present instance, is preferably covered on its periphery with rubber in order that it may obtain a proper hold upon the web without slippage. Adjacent to these feeding rollers are arranged an idler roller 27 and a coöperating gum-applying roller 28, the latter having a rib 28ª thereon conforming to the shape of the edge of the sealing flap of the envelop, and this rib of the gumming roller is supplied with a suitable gum or adhesive by means of a reciprocatory gum-distributing roller 29, the latter receiving an appropriate quantity of gum from the gum-supplying roller 30, which roller is arranged within a gum box 31 and is provided with a cam 32 which rotates therewith and carries the gum-distributing roller 29 into engagement with the gum-applying roller 28 at appropriate intervals by acting upon the swinging frame 33 which supports the said distributing roller, the gum-supplying roller 30 revolving continuously so as to insure a proper feed of the gum.

The gum-depositing roller 28 serves to apply a strip of gum to the web at appropriate intervals, the web passing from this roller beneath the gum box and thence to the printing roller 19 which, it will be observed, will apply an appropriate inscription upon the opposite side of the web and upon such places as will subsequently form a part of the exposed surface of the envelop. The gum for the sealing flaps of the envelops is applied to the strip in the manner indicated in Fig. 7, G indicating the gum impression for the sealing flap of each envelop. Adjacent to the rollers 19 and 20 are mounted a pair of feed rollers 35 and 36, which rollers are arranged in coöperative relation and are adapted to receive and advance the strip between them.

From the printing mechanism and the devices for applying the gum for the sealing flaps of the envelops, the strip is advanced to a drying chamber whereby the gum and the impressions upon the strip may be thoroughly dried before the subsequent operations are performed upon the strip. This drying chamber in the present instance is formed within the base and upper frames of the machine, and it is provided with an entrance roller 37 around which the strip passes after leaving the feed rollers 35 and 36, and it also embodies sets of upper and lower rollers 39 and 40. These rollers within the drying chamber are so formed that those portions of the strip or web which have received the gum and the imprints will not touch such rollers, that is to say, the middle portions of these rollers are reduced in diameter as shown in Fig. 2, the marginal edges of the strip only contacting with such rollers. The web is passed back and forth between these rollers so that a considerable portion of the strip is contained within the driving chamber, or, in other words, sufficient time elapses between the entrance of the strip into the drying chamber and its exit therefrom to insure a thorough drying of the gum deposits and the printed matter upon the strip. The drying chamber is appropriately heated, electric heating coils 115 being provided in the present instance which coils are so arranged as to be distributed within the folds of the strip.

From the heating chamber, the strip with the gum deposits for the sealing flaps and the imprints passes over a regulating or adjusting roller 111, the latter being supported upon an arm 112 which is pivoted in the upper frame at 113, the regulating or adjusting roller swinging in an arc about the pivot 113 as a center and thereby insuring the passage of the web between the creasing rollers at the proper angle and in such a manner as to insure registration of the folding dies of these rollers with the gummed and printed portions upon the strip. From this regulating or adjusting device, the strip passes to a pair of feed rollers 41 and 42, the roller 41 being driven positively by suitable gearing actuated by the shaft 6, while the roller 42 is preferably driven by friction, a spring 43 controlled by a set-screw 44 serving to press the roller 42 into engagement with the strip so as to prevent slippage between it and the positively driven feed roller 41. At the time the strip reaches these feed rollers, the gummed and printed portions thereon will be thoroughly dry. From the feed rollers 41 and 42, the strip passes between a pair of creasing rollers 46 and 47, the roller 46 being preferably driven positively by suitable gearing from the shaft 6 while the roller 47 is driven frictionally from the roller 46. The feed rollers 41 and 42 and the creasing rollers are all journaled in an appropriate frame 45 which is mounted within a walled compartment arranged in the machine frame. These creasing rollers are shown in detail in Figs. 14–17, inclusive, the roller 46 having a rectangular male die 49 upon its periphery, while the roller 47 has a correspondingly shaped female die 50 formed in its periphery, these dies coöperating to crease the strip at those points where the flaps of the envelop merge into the body portion thereof, this crease being indicated by the reference character C in Fig. 8.

Below the creasing rollers are mounted a pair of cutting rollers 51 and 52, the roller 51 being in the form of a rotary knife having a blade 56 arranged around its periphery and conforming in contour to the envelop blank which is to be cut from the strip preparatory to the folding thereof. This blade or cutting knife is formed of a ribbon of steel which is appropriately bent and fitted into the wall of a groove 57 which is formed in the periphery of the cutting cylinder, the knife being held in position by means of a pliable strip 58 which is screwed or otherwise fastened to the roller and coöperates with a flange upon the knife blade. This securing strip may be composed of copper and preferably has its exposed surface beveled toward its opposite longitudinal edges as shown in Fig. 13. The groove which contains the knife conforms in contour to the outline of the envelop blank, and as the knife blade is confined within this groove, it will maintain the appropriate form. The roller 52 which coöperates with the rotary knife is preferably covered with fiber or other suitable material 55, this covering of the roller 52 serving as a backing that will enable the rotary cutter to effectually sever the blank from the strip without becoming dulled. This roller 52 is held yieldingly in coöperative relation with the rotary cutter by means of a spring 54 of appropriate strength.

The strip or web after passing between the cutting rollers has the gum applied thereto for the sealing flap together with the printing matter thereon, the body of the envelop is creased at the points where the flaps join the same, and the blanks are cut from the strip around the flaps thereof as outlines, the strip being shown in this condition in Fig. 9 wherein E designates the blank as it is cut from the strip, 78 designates the two end flaps, 83 represents the bottom flap which is to be pasted and folded down upon the end flaps, and 97 represents the sealing flap which has the gum already applied thereto, this gum on the sealing flap at this time being perfectly dry.

The next operation upon the strip is to strip the cut blanks therefrom and to conduct the waste portion of the strip from the machine. This stripping operation is performed by a stripper 59 which is curved to fit around the lower portion of the cutting roller 51 and it has a pointed edge which is arranged immediately below the point of contact between the cutting devices or the cutting rollers 51 and 52. This pointed edge of the stripper also leads at its outer side to a pair of endless conveyers or belts 61, the latter being mounted at their upper ends upon a pair of rollers 60 and are guided at their lower ends by means of rollers 62, the proximate faces of these two belts being arranged in close relation and travel in the same direction so that the marginal or waste portion 63 of the strip is caused to travel from the machine. The stripper engages the blanks which have been previously cut from the strip, deflecting them into a path beneath the cutting roller 51 and upon a horizontally-traveling belt 66. This belt is driven from a roller 65 which in turn serves to drive the belts 66 by means of connecting belts 64. The belt 66 is preferably composed of rubber or other appropriate material which will obtain the requisite frictional hold upon the blanks, and the upper side of the belt is supported in horizontal position by means of intermediate rollers 69, 70 and 71 and by means of an end roller 72. The roller 65 is driven by a gear 73 which is connected by a train of gears 74 and 75 to the shaft which is provided with the driving gear 9, the latter being actuated from the shaft 6 as shown in Fig. 2. This gear 73 serves also to drive the rollers 41, 46 and 51, the roller 41 having a gear thereon, the roller 46 having a gear 48 thereon, while the roller 51 is provided with a gear 53, these gears being all connected by intermediate or idler gears in order that they may revolve in the same direction. The stripper 59 by reason of its close proximity to the cutting roller 51 will engage that portion of the blank which is first cut from the strip and will thereby start the blank around the under side of the roller 51. The remaining portion of the blank is still uncut and it is therefore impossible for the blank to fall from the strip at this point. As the blank is being finally cut from the strip, its forward portion is resting upon the belt 66 at which point, a guide 67 is mounted, this guide having its forward end arranged in immediate proximity to the roller 51 and this guide is of a width equal to the length of the envelop so that the lateral flaps 78 of the blank will be exposed at its opposite sides. The belt 66 engaging the under side of the blank will cause it to be advanced beneath the guide. This guide 67 is supported from above by means of a cross beam 67ª which spans the space between the side members of the frame 45. At the opposite sides of the guide 67 are arranged a pair of folding plates 79, these folding plates being shown in detail in Figs. 17 to 20, inclusive. Each folding plate has an inclined lifting edge 80 which will operate initially to lift the respective end flap of the envelop, and an overhanging or inwardly extending ledge 81 of the folding plate will then engage the end flap so as to fold it inwardly, and a depending edge 82 upon the folding plate will then act upon the flap to depress it and thus carry it into closely folded relation to the body portion of the blank.

Beyond the guide 67 and folding plates for the end flaps of the envelop, is mounted a gumming roller 84, this gumming roller being mounted upon a shaft 77 which carries the driving gear 9, and this roller has on its periphery a gum-applying portion 85 and also a blank-engaging portion 86 which is adapted to coöperate with the folded flaps of the blank and thus draw it into position beneath the roller 84 so that the gum-applying rib 85 thereon will deposit the gum upon the inner marginal edges of the end flaps. This gum-depositing rib 85 upon the gum roller is supplied with gum by means of a gum-feeding roller 107 which revolves continuously within a gum box 124, and a gum-distributing roller 118 which is mounted in a swinging frame 120, this frame when in one position causing the distributing roller 118 to coöperate with the roller 108, and when carried into a second position, to coöperate with the gum-depositing rib 85 upon the roller 84. Normally, the roller 118 is held evenly in engagement with the roller 107 by means of a spring 122 which acts upon an extension 121 of the swinging frame 120, and a cam 119 which revolves with the roller 107 serves to automatically carry the roller 118 into a position to apply the gum to the gum-depositing rib 85. While the portion 86 of the roller 84 which serves to introduce the blank beneath this roller is opposite to the roller 118, the latter of course will be in contact with the roller 107 so that it will not apply gum to this part of the gum-applying roller.

Adjacent to the gum-applying roller 84 is mounted a turning and folding device for the bottom flap of the envelop, it being arranged in such a position that it will engage the rear flap before the portion 86 disengages from the blank. This turning and folding device for the bottom flap of the envelop is shown in detail in Figs. 10 and 11, it consisting of a downwardly extending curved plate 87 which is pivotally mounted at 81ª and is provided with a spring 88 which normally acts to depress it so that its lower edge will rest in immediate proximity to the upper side of the conveyer belt 66, as shown in Fig. 10. A lifting arm 89 is attached to the plate 87 and is arranged to be actuated by a cam projection 90 which is arranged at an appropriate point on the shaft 77 for the roller 84. At the time the blank passes from beneath the roller 84, the bottom flap of the envelop will project in advance of the blank and the inner marginal edges of the end flaps of the envelop which have gum applied thereto. The blank is fed from beneath the roller 84 by means of the raised portion 86 thereon, and the bottom flap of the envelop L is caused to strike the curved face of the plate 87, this end flap being thereby deflected upwardly, and the moment the body portion of the blank reaches the folding plate, the latter will be elevated by means of the cam projection 90 acting upon the arm 89, and as this folding plate is elevated, it will provide a sufficient space between it and the conveyer belt 66 to permit the blank to pass beneath it, and as the blank is thus advanced, the bottom flap will be folded down upon the gum portions of the end flaps. Immediately adjacent to the folding plate 87 are mounted a pair of pressing rollers 91 and 92, the latter being arranged in coöperative relation with the rollers 71 and 72 beneath the belt and these rollers serve the dual function of firmly pressing the flap down upon the gummed end flaps to complete the pasting thereof and to properly feed the envelop to the stacking and delivering device. This stacking and delivering device is shown in Figs. 3, 5 and 6 and, in the present instance, it is capable of stacking a predetermined number of completed envelops and delivering them from the machine in lots. The delivering device shown in the accompanying drawing consists of a receptacle 93 having an end wall 94 which is arranged in alinement with the upper surface of the belt 66, thereby forming an abutment against which the envelops strike when they are discharged by the rollers 91 and 92. As the completed envelops pass beneath the rollers 91 and 92, the side flaps are folded inwardly and the bottom flap is folded upon them and pasted, although the sealing flap 97 will remain, as yet, unfolded.

Within the delivering device are mounted a pair of oppositely arranged serrated blocks 98 which serrated blocks are adapted to engage the top and bottom edges of the envelop as it drops into the receptacle and thereby support the envelop in such a manner as to prevent the envelop from dropping into the bottom of such receptacle. The receptacle is of a width equal to the height of the envelop, and as it passes into the receptacle, the sealing flap 97 thereon will stand vertically, as shown in Fig. 5. Within the receptacle is mounted a follower 95 which is mounted to reciprocate vertically on guides 116, a spring 119 normally operating to lift the follower. The under side of the follower is cut out as at 123 so as to form a clearance space to permit the final folding of the sealing flap 97 upon the entrance of the next envelop into the receptacle, such envelop entering the receptacle striking the sealing flap of the topmost envelop therein and thereby causing the folding of such flap. The blanks are fed intermittently into the receptacle and the follower is reciprocated at appropriate intervals, that is to say, between the time one envelop is introduced therein and the time the next envelop follows it. Any suitable means may be employed for appropriately reciprocating the follower, a cam 117 being shown in the present instance which acts upon a lug 117ª, the latter acting upon the spring 119 to force the follower down into the envelops contained in the receptacle. At the moment an envelop is being delivered to the receptacle 93, the sealing flap 97 of the topmost envelop contained in the receptacle will stand vertically, as shown in Fig. 5, and the follower 95 is in an elevated position as shown in Fig. 6. The envelop discharged into the receptacle 93 from the rollers 91 and 92 will first strike the upstanding sealing flap 97 and fold it down upon its respective envelope, the latter envelop striking the wall 94 of the receptacle and then settling down until it reaches the serrated surfaces 98 formed in the opposite walls of the receptacle. The follower 95 will then descend, carrying the envelop just introduced downwardly, and all envelops which are supported upon the serrated surfaces 98 will be moved downwardly one step, the lowermost envelop dropping from these serrated surfaces into the pile of envelops resting upon the bottom 99 of the receptacle. After a predetermined number of envelops has accumulated in the bottom of the receptacle, they are automatically ejected therefrom a distance sufficient to enable the operator to apply a band thereto and to remove the bundle of envelops from the machine. The ejecting device in the present instance consists of a revolving disk 104 having a cam-shaped projection 105 thereon which is arranged to strike the end of a rod 103 at the moment the appropriate number of envelops has accumulated in the delivering device. This rod 103 is connected to a plunger 100 which is mounted to enter one end of, and to reciprocate partially across the bottom 99 of the receptacle, this plunger being of a height equal to that of a pile of envelops of the desired number to be discharged. A spring 102 normally serves to hold this plunger in an inoperative position, and when the disk 104 reaches such a position as to bring the cam projection 105 thereon into engagement with the rod 103, the action of this spring 102 will be overcome and the plunger will be forced inwardly into the lower portion of the receptacle, causing an appropriate number of envelops to be partially ejected from the opposite end of the receptacle which is left open for this purpose. The disk 104 in the present instance is so arranged as to rotate once for each discharging operation, and in order to accomplish this result, the shaft upon which the disk is mounted is provided with a ratchet wheel 106 which contains teeth of a number corresponding to the number of envelops to be discharged at each operation. An actuating pawl 110 coöperates with this wheel, this pawl being mounted upon a pivoted arm 109 and this arm is operated once each time an envelop is delivered into the receptacle 93, a cam projection 108 being mounted to rotate with the gum-supplying roller 107 in order to accomplish this result.

According to the present invention, the application of the gum for the sealing flap is applied to that portion of the strip or web which will subsequently form the sealing flap of the envelop, but as this portion of the flap at this time forms a part of the strip, it is obvious that such contraction as may be caused by the drying of the gum will be uniform so that coiling of the flap as happens in those cases where the gum is applied after the envelop has been cut, is avoided. The application of the gum for the sealing flap of the envelop and also the printing thereof are accomplished before the subsequent operations of creasing, cutting and folding the blank are effected, the strip after the application of the gum for the sealing flap and after printing, passing first into a drying chamber so that the initially-applied gum and printing matter will be thoroughly dry before the subsequent operations are performed thereon. According to the present invention, the various operations are performed by a continuous rotation of the various rollers, and the various feeding rollers and their operating parts are so associated that the portion of the strip containing the blank does not wholly leave one pair of rollers before it is engaged by the next pair, a positive feed of the strip being thereby insured and registration of the different portions of the strip with the devices which perform the respective operations thereon is effected. By creasing the inner margins of the flaps preparatory to the folding operation, an absolutely correct folding of the flaps on the creased lines is insured, the envelops being perfectly square and none of its flaps will be imperfectly folded, and as this creasing operation is performed while the material is in the form of a strip, a proper positioning of the creasing lines with respect to that portion of the strip which is to subsequently form the envelop blank is obtained. By arranging the creasing devices in immediate proximity to the cutting rollers, the strip is positively advanced from the creasing rollers to the cutting rollers, and an accurate registration of those portions of the strip to form the blank, with the cutting rollers is insured. Moreover, from the time the material enters the machine in the form of a continuous strip of paper until it leaves the machine in the form of completed envelops, all operations involved in the formation of the envelops are accomplished automatically.

I claim as my invention:

1. In an envelop machine, the combination of means for feeding a web of paper to the machine, a device for applying a transverse line of gum to those portions of the web which are subsequently to constitute the sealing flaps of the envelops, a drying chamber arranged to receive the web after the said application of gum thereto, creasing devices operative on the web to form longitudinal and transverse creases which define the face or body of the envelop, knives operative upon the web on lines wholly within the marginal edges thereof for severing the blanks from the web whereby the remainder of the web is in the form of a continuous strip, a stripper for removing the severed blanks from the web, and a conveyer for drawing the remaining portion of the web from the machine in the form of a continuous strip.

2. In an envelop machine, the combination of means for feeding a web of paper to the machine, a device for applying at appropriate intervals transverse lines of gum to those portions of the web which are subsequently to constitute the sealing flaps of the envelops, a printing device for making imprints at appropriate intervals on the web at the opposite side from that which receives the gum, a drying chamber arranged to receive the web after the gum and imprints have been applied thereto, creasing devices operative on the web to form longitudinal and transverse creases which define the body of the envelop, knives operative upon the web on lines wholly within the marginal edges thereof for severing the blanks from the web whereby the remainder of the web is in the form of a continuous strip, a stripper for removing the severed blanks from the web, and means for drawing the continuous remaining portion of the web from the machine.

3. In an envelop machine, the combination of means for feeding a web of paper to the machine, a gumming device for applying a line of gum to the web in a direction transversely thereof and to those portions of the web which are subsequently to constitute the sealing flaps of the envelops, creasing devices having rectangular dies coöperating with the web to form rectangular indentations conforming to the outline of the body of the envelop which indentations are located in the previously gummed side of the web, and means for severing the blanks from the web, on lines wholly within the marginal edges of the web whereby the remainder of the web is in the form of a continuous strip, a stripper for removing the severed blanks from the web, and means for drawing the continuous remainder of the web from the machine.

4. In an envelop machine, the combination of means for feeding a web of paper thereto, a device for applying transversely extending lines of gum to those portions of the web which are to constitute the sealing flaps of the envelops, creasing devices having coacting male and female dies coöperative with the web to form rectangular indentations conforming to the outline of the body of the envelop in that side of the web to which the said lines of gum have been applied, knives for severing the blanks from the web on lines wholly within the marginal edges of the web whereby the remainder of the web is in the form of a continuous strip, a stripper for removing the severed blanks from the web, means for drawing the continuous remainder of the web from the machine, folding devices for turning inwardly the end flaps, a gumming device for applying gum to the inturned end flaps of the envelop, and means for folding and pressing the bottom flap of the envelop upon the inturned and gummed end flaps.

5. In an envelop machine, the combination of means for feeding a continuous web of paper to the machine, a gumming device for applying transversely extending lines of gum to those portions of the web which are subsequently to constitute the sealing flaps of the envelops, creasing devices for forming rectangular indentations at that side of the web to which the said gum has been applied, said indentations having an outline corresponding to the body of the envelop, cutting devices for severing the blanks from the web on the lines contained wholly within the lateral edges of the web, a stripper for removing the severed blanks from the web and directing the continuous remainder of the web from the path of the blanks, a folding device for turning inwardly the end flaps of the blanks, a device for applying gum to the inturned end flaps, a device for turning the bottom flap upon the gummed end flaps, and means for pressing the bottom flap to such gummed end flaps.

6. In an envelop machine, the combination of means for feeding a web of paper to the machine, a device for applying gum at appropriate intervals to the web, a creasing device having rectangular dies coöperative with the web after the gummed portions thereof have been dried to form offsets in the web corresponding in size and shape to that of the face or body of the envelops, a device for severing the envelop blanks from the strip, a stripper for removing the severed blanks from the web and diverting the continuous remainder of the web from the path of the severed blanks, a conveyer operative upon the continuous remainder of the web to draw it continuously from the machine, a device for folding the end flaps of the envelop inwardly and in a direction transverse to the line of movement thereof, a device for pasting the end flaps, means for folding the bottom flap of the envelop and pressing it upon the end flaps, and means for finally folding the previously gummed sealing flap.

7. In an envelop machine, the combination of means for feeding a web of paper to the machine, a device for applying gum at appropriate intervals to the web, a drying chamber through which the web passes after said application of gum thereto, a device for creasing the strip on lines extending both longitudinally and transversely of the web upon which lines the flaps of the envelops are to be folded, the creasing device adapted to receive the web after its passage through the drying chamber, means for severing the creased blanks from the strip, a curved plate movable transversely of the line of movement of the blank for folding the end flaps of the blank after being severed from the strip, and a device for pasting the bottom flap to the end flaps of the envelop.

8. In an envelop machine, the combination of means for feeding a web of paper to the machine, a device for applying gum at intervals to those portions of the strip which are to subsequently constitute the sealing flaps of the envelops, a drying chamber arranged to receive the strip after the said application of gum thereto, a pair of creasing rollers arranged to operate upon the web after its passage through the drying chamber to crease the web at one operation on lines which define the face or body of the envelop, a pair of cutting rollers arranged to receive the web from the creasing rollers and to sever the envelop blanks from the web, a stripper for removing the severed blanks from the web, a folding device arranged to receive the blanks from the stripper and to fold the end flaps, and means for folding and pasting the bottom flap of the envelop to the side flaps thereof.

9. In an envelop machine, the combination of means for feeding a web of paper thereto, a device for applying gum at appropriate intervals to the strip, a drying chamber arranged to receive the web after the said application of gum thereto, a pair of creasing rollers arranged to operate upon the web after its passage through the drying chamber to crease the web on lines which define the face or body of the envelop, a pair of cutting rollers arranged to receive the web from the creasing rollers to sever the envelop blanks from the web, a stripper for removing the severed blanks from the web, a pair of conveyers arranged to receive the web after the removal of the envelop blanks therefrom, a folding device arranged to receive the severed blanks from the stripper and to fold their end flaps, and a device for folding and pasting the bottom flap to the end flaps of each blank.

10. In an envelop machine, the combination of means for feeding a web of paper thereto, a device for applying gum at appropriate intervals to the web, a drying chamber arranged to receive the web after the application of gum thereto, a pair of creasing rollers arranged to receive the gummed web after its passage through the drying chamber, and a compensating device interposed between the creasing rollers and the drying chamber and coöperative with the web as it leaves such drying chamber whereby those portions of the web which are creased by the creasing rollers will register appropriately with the gummed portions of the web.

11. In an envelop machine, the combination of means for feeding a web of paper thereto, creasing rollers arranged to coöperate with the web and capable of creasing the latter at one operation on longitudinal and transverse lines which completely define the face or body of the envelop, a device for severing the envelop blanks from the web after the creasing operation is performed upon the web, a stripper arranged to remove the severed blanks from the web, a conveyer, a folding device arranged in coöperative relation with the conveyer and arranged to receive the blanks from the stripper, said folding device operating to fold the end flaps of the blanks, a folding plate also arranged in coöperative relation with said conveyer and operative to engage the bottom flap of the envelop blank and fold it upon the end flaps, and a pasting device for applying gum to the end flaps prior to the folding of the bottom flap.

12. In an envelop machine, the combination of means for feeding a web of paper to the machine, a device for applying gum to those portions of the strip which are to subsequently constitute the sealing flaps of the envelop, a pair of creasing rollers arranged to operate upon the web after the said application of gum thereto to crease the web on longitudinal and transverse lines which define the face or body of the envelop, a pair of severing rollers arranged to operate upon the creased portions of the web before the creasing operation has been completed by the creasing rollers, a device for stripping the severed blanks from the web, a conveyer and a folding device arranged to receive the blank before the same has been fully severed from the web, folding plates for turning the end flaps of the envelops, a gumming roller arranged to apply gum to the inner marginal edges of the end flaps before the blank has left the folding plates, a device arranged to coöperate with the blank to turn and fold its bottom flap over the end flaps before the blank has left the gum applying roller, and a delivering device arranged to receive the completed envelops.

13. The combination with an envelop making machine having means capable of creasing blanks on lines which define the face or body of the envelop, and devices for folding and pasting the end and bottom flaps, of a delivering device having a receptacle, means for conveying the envelops to said receptacle with their sealing flaps creased, and a deflector arranged to coöperate with the envelops as they are introduced into said receptacle for so directing them as to cause the closing of the sealing flap on the envelop by the entrance of the next succeeding envelop into the receptacle.

14. In an envelop machine, the combination of means for feeding a strip of paper to the machine, a device for applying at intervals transverse lines of gum to those portions of the strip which are subsequently to constitute sealing flaps of the envelop, a drying chamber arranged to receive the strip after the application of said gum thereto, a device for creasing the strip at one operation both on longitudinal and transverse lines which define the face or body of the envelop, means to receive the creased strip and to sever the envelop forms from the remainder of the strip, means to receive the severed envelop forms and to fold their end flaps inwardly transverse to the direction of movement of the forms, and an intermittently operating device for folding the bottom flap of the envelop form upon the folded end flaps, the various operations being performed while the envelop form is advanced continuously.

In testimony whereof I have hereunto set my hand in presence of two subscribing witnesses.

ALBERT J. ACKERMAN.

Witnesses:
PAUL T. TRENTLER,
GEO. PLACE.